(12) United States Patent
Goeke et al.

(10) Patent No.: US 10,253,822 B2
(45) Date of Patent: Apr. 9, 2019

(54) FLEXIBLE COUPLINGS WITH ANGULAR LIMITERS

(71) Applicant: Goodrich Corporation, Charlotte, NC (US)

(72) Inventors: Jerry Lee Goeke, Vernon Center, NY (US); Jeffrey Mathis, Rome, NY (US)

(73) Assignee: Goodrich Corporation, Charlotte, NC (US)

( * ) Notice: Subject to any disclaimer, the term of this patent is extended or adjusted under 35 U.S.C. 154(b) by 104 days.

(21) Appl. No.: 15/342,613

(22) Filed: Nov. 3, 2016

(65) Prior Publication Data

US 2018/0119747 A1    May 3, 2018

(51) Int. Cl.
*F16D 3/76* (2006.01)
*F16D 3/77* (2006.01)

(52) U.S. Cl.
CPC ........ *F16D 3/76* (2013.01); *F16D 3/77* (2013.01)

(58) Field of Classification Search
CPC ........................................................ F16D 3/76
USPC .............................................. 464/79, 80, 99
See application file for complete search history.

(56) References Cited

U.S. PATENT DOCUMENTS

| | | | |
|---|---|---|---|
| 2,209,325 A | 7/1940 | Dennis | |
| 4,133,188 A | 1/1979 | Cartwright | |
| 4,196,597 A | 4/1980 | Robinson | |
| 4,802,882 A | 2/1989 | Heidrich | |
| 5,364,309 A | 11/1994 | Heidrich et al. | |
| 6,273,824 B1 | 8/2001 | D'Ercole et al. | |
| 8,235,828 B2 | 8/2012 | Davies et al. | |

FOREIGN PATENT DOCUMENTS

| | | | | |
|---|---|---|---|---|
| EP | 0211090 A1 | 2/1987 | | |
| EP | 0 627 571 A1 | * 12/1994 | | |
| FR | 1.342.647 | * 11/1963 | ............... | F16D 3/76 |
| GB | 2043207 A | 10/1980 | | |

OTHER PUBLICATIONS

Search report dated Apr. 26, 2018 in corresponding European Application No. 17199673.9.

* cited by examiner

*Primary Examiner* — Greg Binda
(74) *Attorney, Agent, or Firm* — Locke Lord LLP; Scott D. Wofsy; Joshua L. Jones (57) ABSTRACT

A flexible coupling includes a flexure, a first drive member defining an axis and connected to the flexure, and a second drive member. The second drive member defines an axis and is connected to the flexure on a side of the flexure opposite the first drive member. An angular stop is fixed within the first drive member, extends through a portion of the second drive member, and is arranged to limit angular misalignment of the first drive member axis relative to the second drive member axis while transmitting torque between the first and second drive members.

10 Claims, 6 Drawing Sheets

FLEXIBLE COUPLINGS WITH ANGULAR LIMITERS

BACKGROUND OF THE INVENTION

1. Field of the Invention

The present disclosure relates to flexible couplings, and more particularly to diaphragm couplings with features designed to limit angular bending.

2. Description of Related Art

Flexible couplings are commonly used to transmit torque while accommodating axial and/or angular misalignment between driving and driven shaft components along a load path. The flexible couplings generally have stiffness that opposes the angular misalignment accommodated by the flexible coupling. In some flexible couplings, such as flexible couplings with relatively low spring rates, it can be possible to overstress the flexible coupling, either during installation or removal of the flexible coupling. Some flexible couplings can also be overstressed while transmitting torque between rotation shafts when the angular misalignment between the interconnected shafts exceeds a predetermined angular misalignment.

Such conventional methods and systems have generally been considered satisfactory for their intended purpose. However, there is still a need in the art for improved flexible couplings for transmitting torque between rotating members while accommodating misalignment between the members. The present disclosure provides a solution for this need.

SUMMARY OF THE INVENTION

A flexible coupling includes a flexure, a first drive member defining an axis and connected to the flexure, and a second drive member defining an axis and connected to the flexure on a side of the flexure opposite the first drive member. An angular stop is fixed within the first drive member, extends through at least a portion of the second drive member, and is arrange to limit angular misalignment of the first drive member axis relative to the second drive member axis while transmitting torque between the first and second drive members. For purposes of illustration, the first drive member will be considered the end with the splined shaft and the second drive member will be considered the end with the bolted flange. Those skilled in the art will readily understand that either end could be considered the first and second member and that the ends of the coupling could include other types of input or output devices.

The first drive member is connected to the first end of a diaphragm coupling and includes a body, a seat, and an angular stop. The seat extends from the body and is connected to the diaphragm coupling. The angular stop extends from the body and is axially overlapped by the seat and the second member to limit bending of the diaphragm coupling.

In certain embodiments, a bore can extend through the second member. The bore provides for lower mass of the overall coupling system and may be larger, smaller, or non-existent depending on the requirements of the application.

The first member includes a body and seat. The body includes a bore which extends through the first member and provides for an annular gap between the angular stop and the output body. In accordance with certain embodiments, the annular gap can be defined within the flexible coupling. The radial width of the annular gap bounded by the output body and the angular stop allows for a limited amount of angular motion between the first and second members.

A drive train system includes mechanical rotation source, a driving shaft, a driven shaft, driven element, and a flexible coupling as described above. The driving shaft is connected to the first drive member. The mechanical rotation source is connected to the first drive member by the driving shaft. The driven shaft is connected to the second drive member. The driven element is connected to the second drive member by the driven shaft. In certain embodiments the driven element is a rotor assembly for a rotorcraft.

Those skilled in the art will readily understand that first and second members may be constructed as one-piece structures having respective flexible diaphragms, a single weld connecting outer rims of the flexible diaphragms connect the first member to the second member. Either or both of the first and second members, or the entire coupling, can be fabricated using a subtractive manufacturing technique, such as by removing material from an interior of a piece of stock material and machining material from the exterior of the piece of stock material. Either or both of the first and second members can be fabricated using an additive manufacturing technique, such as powder bed fusion by way of non-limiting example.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
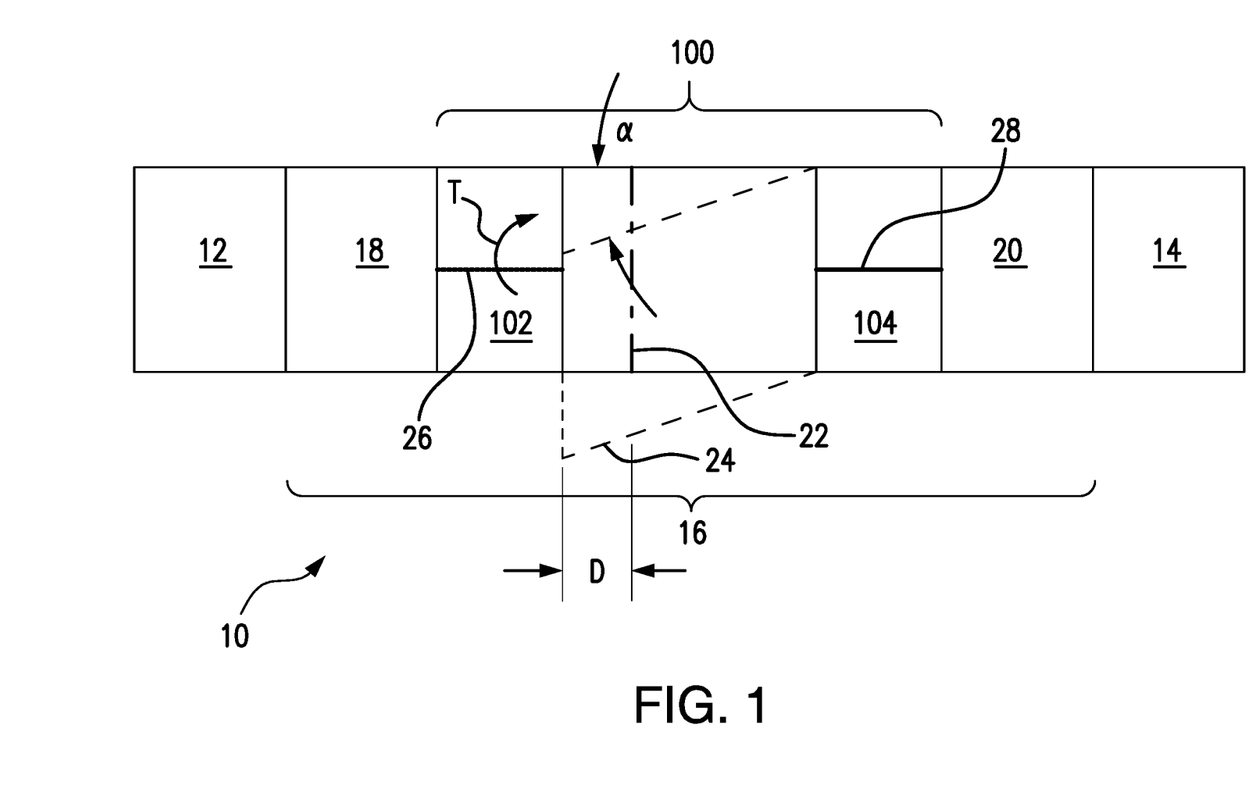
FIG. 1 is a schematic view of an exemplary embodiment of a drive train system constructed in accordance with the present disclosure, showing a flexible coupling connecting a driving member with a driven member.

Reference will now be made to the drawings wherein like reference numerals identify similar structural features or aspects of the subject disclosure. For purposes of explanation and illustration, and not limitation, a partial view of an exemplary embodiment of a flexible coupling in accordance with the disclosure is shown in FIG. 1 and is designated generally by reference character 100. Other embodiments of flexible couplings, drive train systems, and methods of installing, removing, and transmitting torque while accommodating misalignment between driving and driven members in accordance with the disclosure, or aspects thereof, are provided in FIGS. 2-6, as will be described. The systems and methods described herein can be used for drive train systems such as in rotorcraft, though the present disclosure is not limited to rotorcraft or to aircraft in general.

Referring to FIG. 1, a vehicle 10, e.g., a rotorcraft, is shown. Vehicle 10 includes a mechanical rotation source 12 operably connected to a driven element 14 by a drive train system 16. Drive train system 16 includes a driving member 18, a flexible coupling 100 with a first drive member 102 and a second drive member 104, and a driven member 20. First drive member 102 defines an axis 26. Second drive member 104 defines an axis 28. Drive train system 16 transmits torque T via flexible coupling 100 between mechanical rotation source 12 and driven element 14 while accommodating one or more axial misalignment 22 (shown with dotted-dashed line and indicated by offset dimension D) between first drive member 102 and second drive member 104 and angular misalignment 24 (shown in dashed line and indicated by angle indicator alpha) between axes defined by first drive member 102 and second drive member 104. As used herein, the term misalignment can refer to either or both of axial misalignment and angular misalignment.

Mechanical rotation source 12 may include a motor or an engine, such as a gas turbine engine, and is connected to driving member 18. Driving member 18 is connected to first drive member 102 of flexible coupling 100. Driven member 20 is connected to second drive member 104. Driven element 14 is connected to driven member 20 may include, by way of non-limiting example, a rotor assembly. Although flexible coupling 100 is described herein as transmitting torque T from first drive member 102 to second drive member 104, it is to be understood and appreciated that torque can also be transmitted from second drive member 104 to first drive member 102, as suitable for an intended application.

Figure 2:
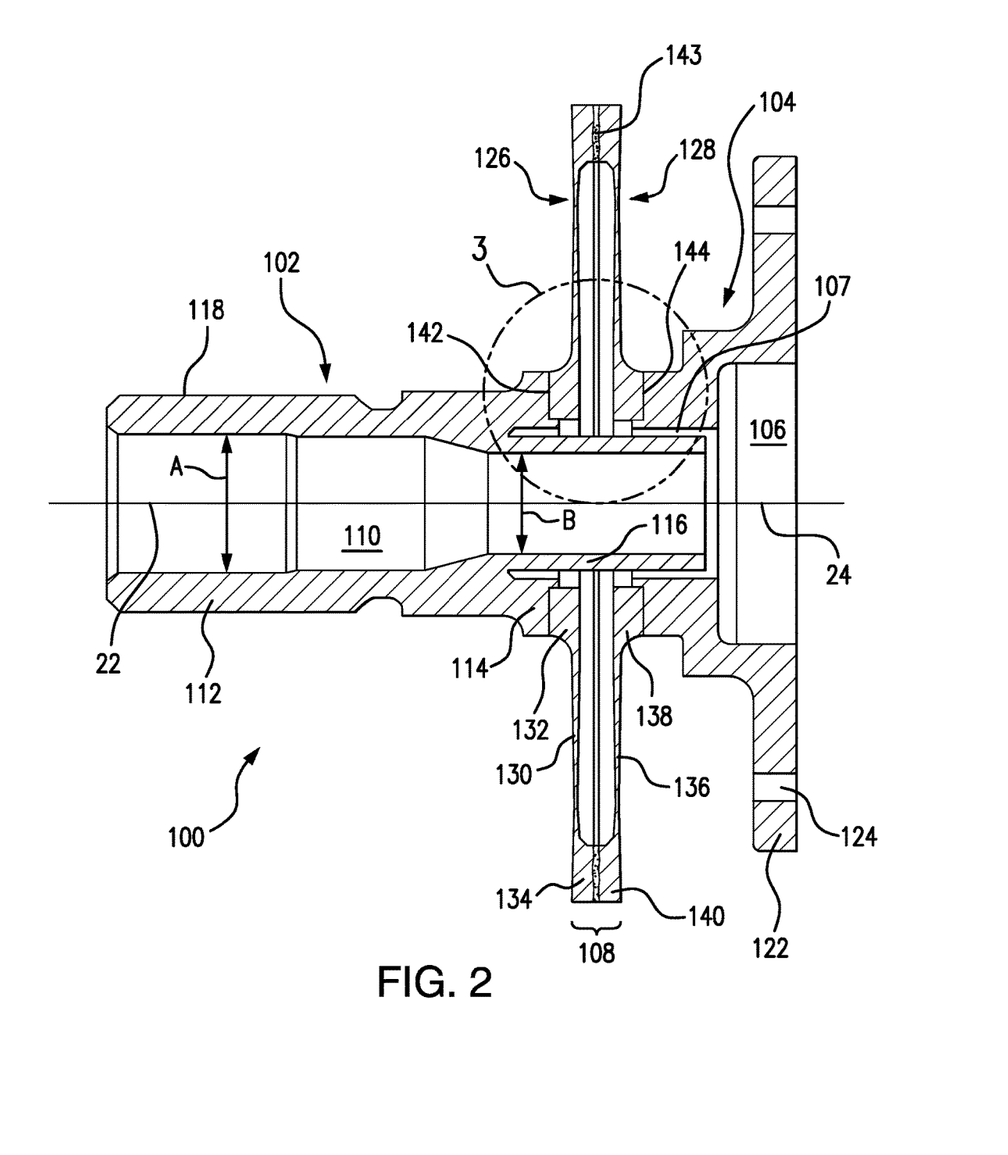
FIG. 2 is a cross-sectional side view of the flexible coupling of FIG. 1, showing a first drive member with an angular stop connected to a second drive member by a flexure.

With reference to FIG. 2, flexible coupling 100 is shown. Flexible coupling 100 includes first drive member 102, second drive member 104, and a flexure 108. First drive member 102 is connected to flexure 108. First drive member 102 defines an internal bore 110 and includes a body 112, a seat 114, and an angular stop 116. Seat 114 extends axially from body 112 and is connected to flexure 108 opposite second drive member 104. Seat 114 axially overlaps angular stop 116 and is radially separated from angular stop 116 by annular gap 107.

Bore 110 tapers from a first width A defined within body 112 to a second width B defined within angular stop 116. Second drive member 104 defines a bore 106 which, in conjunction with bore 110 of first drive member, defines an open through-bore extending through flexible coupling 100. As will be appreciated by those of skill in the art in view of the present disclosure, the open through-bore collectively formed by bore 110 and bore 106 has no internal contacting surfaces, which potentially could wear against one another.

Angular stop 116 extends axially from body 112 and is axially overlapped by at least a portion of second drive member 104. A radial gap 107 separates angular stop 116 from seat 114, flexure 108, and a portion of second drive member 104 to constrain bending of flexure 108 associated by angular misalignment of first drive member 102 relative to second drive member 104. As will be appreciated by those of skill in the art in view of the present disclosure, angular misalignment can result from manipulation of flexible coupling 100 during installation and/or removal as well as from misalignment within elements of drive train system 16 (shown in FIG. 1) accommodated while transmitting torque T (shown in FIG. 1).

Flexure 108 includes a plurality of diaphragm elements extending between inner hub and outer rims and interposed between first drive member 102 and second drive member 104. While shown in the illustrated exemplary embodiments as having diaphragm elements, it is to be understood and appreciated that flexure 108 can include other types of flexure structures such as a bellows coupling, a helical coupling, or any other flexible coupling where one of either the input shaft or the output may overlap in this type of geometry, as suitable for an intended application. As shown in FIG. 2, flexure 108 includes a first diaphragm element 126 and a second diaphragm element 128. This is for illustration purposes only and is non-limiting as flexure 108 can include a single diaphragm element or more than two diaphragm elements, as suitable for an intended application. Although flexure 108 is illustrated in the exemplary embodiment as a diaphragm element, it is to be understood and appreciated that other types of flexures, such as disks, gears, flex frames, universal joints, and elastomeric joints by way of non-limiting example can also benefit from the present disclosure.

First diaphragm element 126 has flexible diaphragm portion 130 extending radially between an inner hub 132 and an outer rim 134. Second diaphragm element 128 is similar to first diaphragm element 126 and includes a flexible diaphragm portion 136 extending between an inner hub 138 and an outer rim 140. Either or both of flexible diaphragm portion 130 and 136 may be arranged to taper in axial thickness to a radial location of minimum thickness between the respective inner hub and outer hub. In this respect either or both of first diaphragm element 126 and second diaphragm element 128 may be, for example, as described in U.S. Pat. No. 8,591,345 to Stocco et al., the contents of which are incorporated herein by reference in it is entirety.

Figure 3:
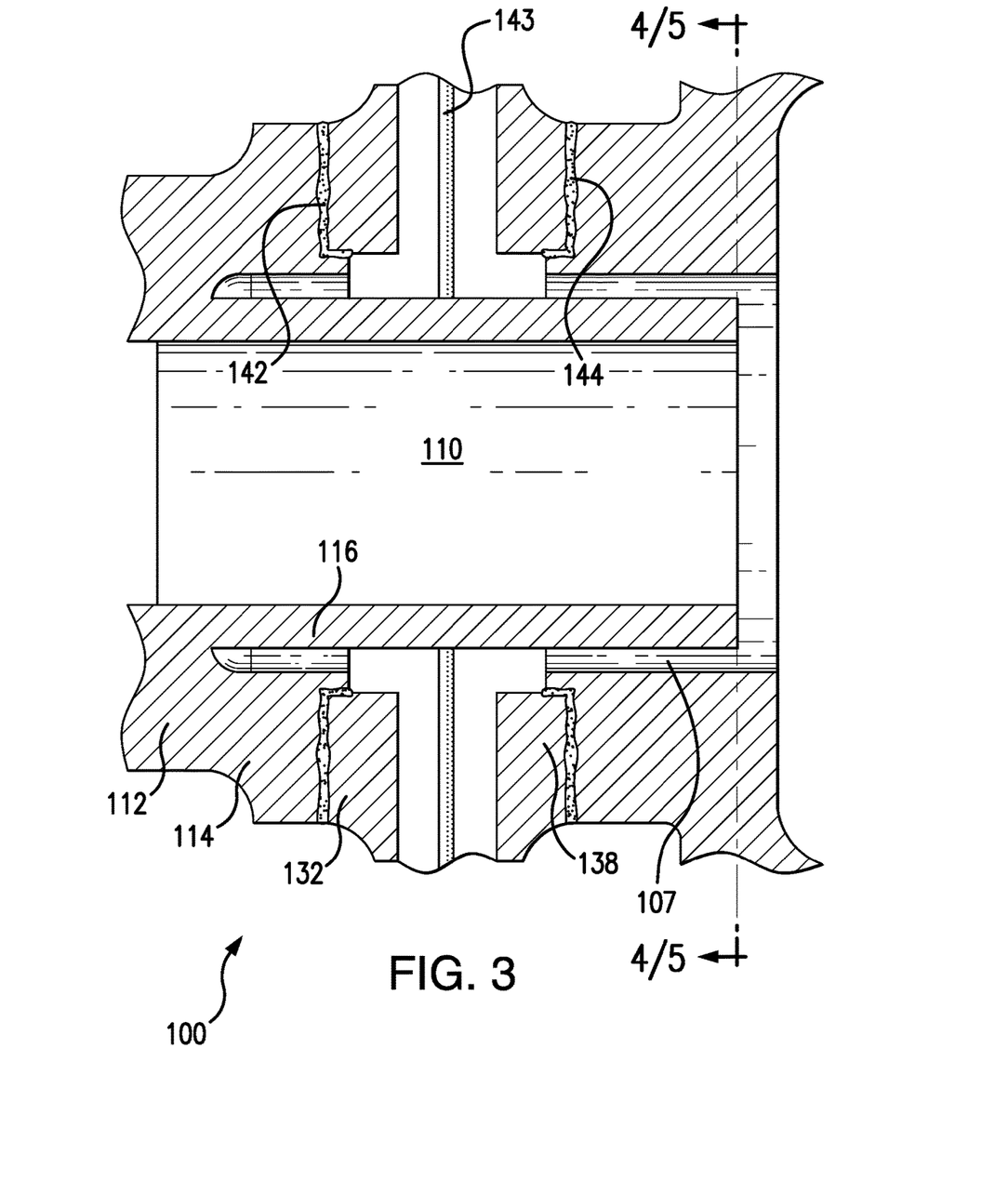
FIG. 3 is a cross-sectional side view of a portion of the flexible coupling of FIG. 1, showing an annular gap defined within an interior of the flexible coupling between the angular stop and the first and second drive members.

Referring to FIGS. 2 and 3, first diaphragm element inner hub 132 is coupled to first drive member seat 114. The coupling may be, for example, through a first weld 142. First diaphragm element 126 couples to outer rim 140 of second diaphragm element 128 at outer rim 134. The coupling between first diaphragm element 126 and second diaphragm element 128 may be, for example, through an intermediate weld 143. Second diaphragm element 128 couples at inner hub 138 to second drive member 104. The coupling between inner hub 138 and second drive member 104 may be, for example, through a second weld 144.

As will be appreciated by those of skill in the art, connecting elements of flexible coupling 100 using welds eliminates contacting surfaces at element interfaces, removing potential sources of wear that such contacting surfaces could otherwise pose in flexible coupling 100. Either or both of first weld 142 and second weld 144 may include a 90 degree weld extending about an axial collar first drive member 102 and/or second drive member 104, the axial collar facilitating assembly of flexible coupling 100 by providing registration of flexure 108 relative first drive member 102 and/or second drive member 104 during assembly. Such welds can also facilitate the transfer of bending loads while transmitting torque and accommodating misalignment between first drive member 102 and second drive member 104.

With continuing reference to FIG. 2, first drive member 102 includes a spline 118. Spline 118 is defined on a radially outer surface of first drive member 102, and is arranged for rotatably fixing flexible coupling 100 to driving member 18 (shown in FIG. 1) such that flexible coupling 100 is axially free relative to driving member 18. Although illustrated as an external spline, it is contemplated that spline 118 can be an internal spline or any other suitable mechanical input device.

Second drive member 104 includes a flange 122. Flange 122 has a fastener pattern 124 configured connecting flexible coupling 100 to a driven member 20 (shown in FIG. 1) such that flexible coupling 100 is fixed both axially and in rotation relative to driven member 20. It is contemplated that fastener pattern 124 of flange 122 cooperate with spline 118 to allow flexible coupling 100 to be installed and/or removed from drive train system 16 (shown in FIG. 1), installation and/or removal generally being facilitated by the ability of flexure 108 to accommodate angular misalignment between first drive member 102 and second drive member 104. Although described herein with a splined first drive member and a flanged second drive member, it is to be understood and appreciated that either or both of first drive member 102 and second drive member 104 can have splines and/or flanges, as suitable for an intended application. It is also to be understood and appreciated that other connection arrangements can be employed to fasten second drive member 104 to driving member 18 and first drive member 102 to driven member 20, including connections like welds that connect directly to a connecting shaft, as suitable for an intended application.

Figure 4:
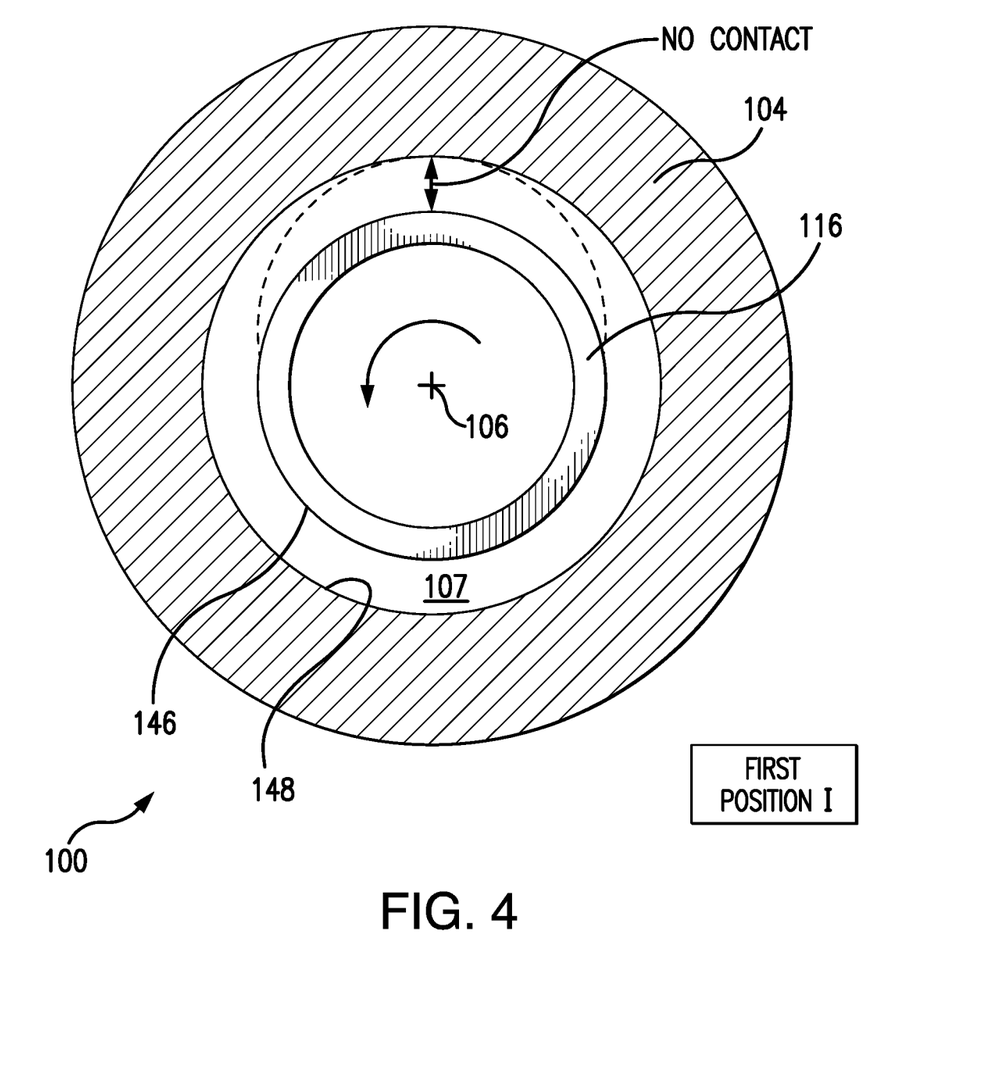
FIGS. 4 and 5 are cross-sectional end views of the flexible coupling illustrated in FIG. 1, showing the angular stop in first and second positions, the angular stop allowing bending in the first position and constraining bending in the second position.
Figure 5:
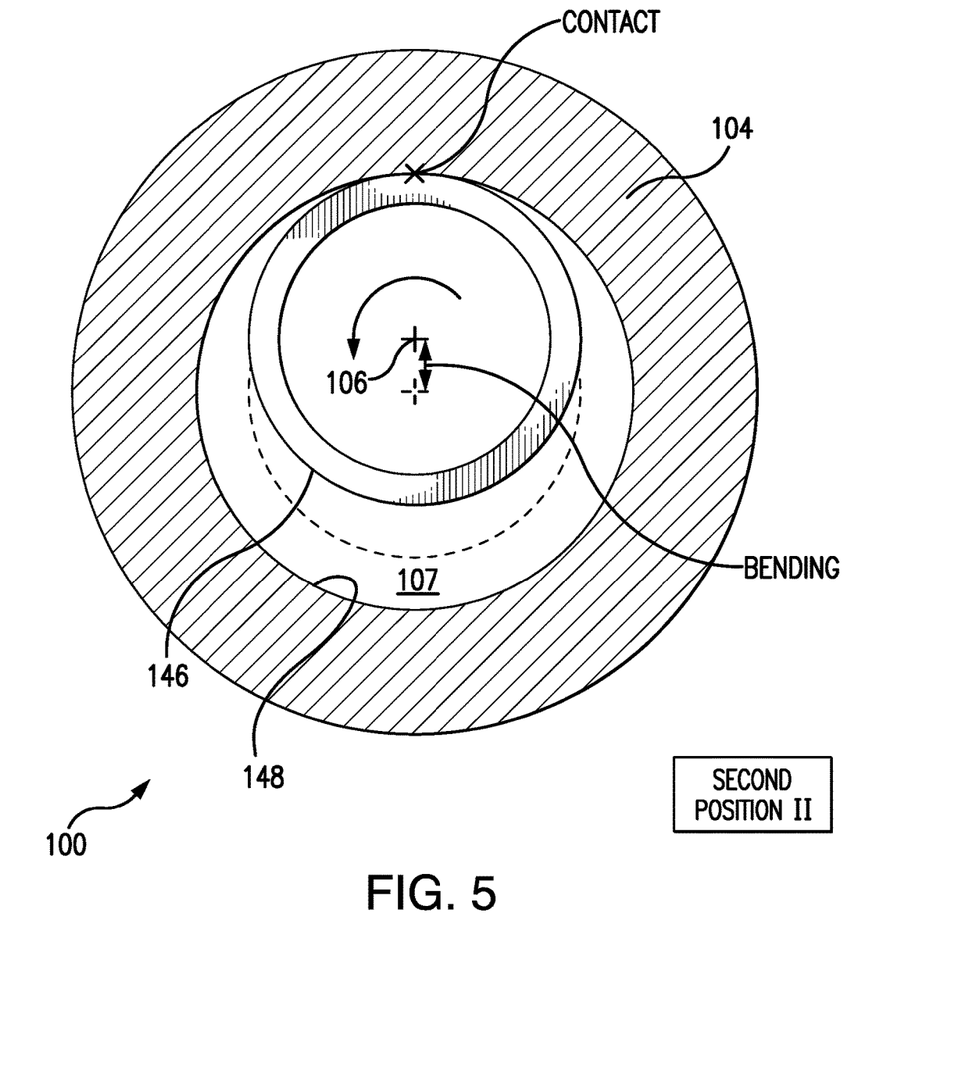

Referring to FIGS. 4 and 5, angular stop has a first position I and a second position II relative to second drive member 104. In the first position, shown in FIG. 4, an outer surface 146 of angular stop 116 is separated from an interior surface 148 of second drive member 104 by radial gap 107, a width defined by radial gap 107 being substantially uniform circumferentially about angular stop 116. In the second position II, shown in FIG. 5, outer surface 146 of angular stop 116 contacts interior surface 148 of second drive member 104, radial gap 107 being circumferentially interrupted at the contact location disposed between angular stop 116 and interior surface 148 of second drive member 104.

When angular mismatch between first drive member 102 and second drive member 104 is such that angular stop 116 is between first position I and second position II, no contact occurs between angular stop 116 and second drive member 104. This prevents wear that would otherwise occur between the contacting surfaces within flexible coupling 100. When angular mismatch between first drive member 102 and second drive member 104 is such that angular stop 116 assumes position II, flexible coupling 100 is axially limited, and further angular mismatch is discouraged (or prevented entirely) by angular stop 116. This prevents deformation of flexure 108 beyond that imposed when angular stop 116 is in position II. This allows limiting the maximum deformation imposed on flexure 108 by the sizing selected for radial gap 107 while minimizing the contact necessitated by the angular misalignment limiting feature of flexible coupling 100 to only instances where the misalignment is such that angular stop 116 is in position II.

Figure 6:
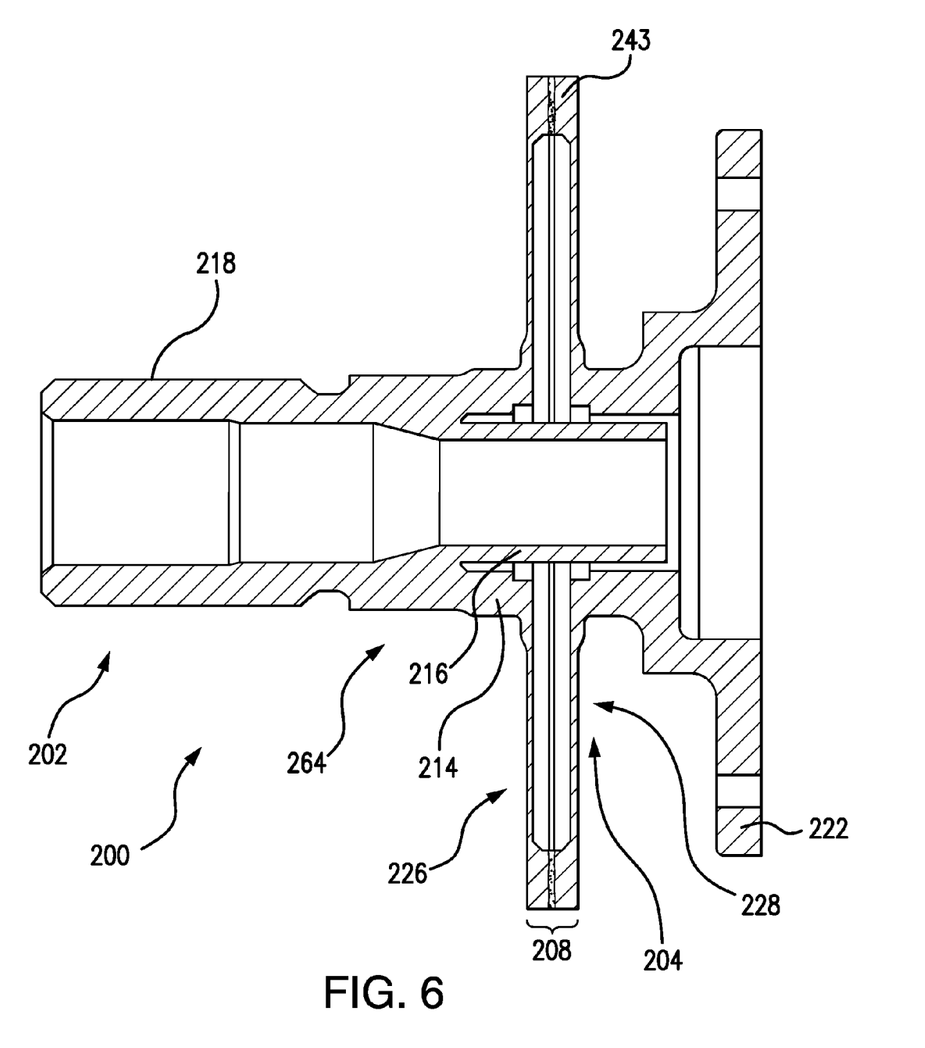
FIG. 6 is a cross-sectional side of another embodiment of the flexible coupling a FIG. 1, showing a two-piece diaphragm coupling including a first drive member connected to a second drive member by a single weld.

With reference to FIG. 6, a flexible coupling 200 is shown. Flexible coupling 200 is similar to flexible coupling 100 and additionally includes a two-piece construction. In this respect flexible coupling 200 includes a first drive member 202 and second drive member 204 integrally formed with a portion of a flexure 208. In this respect first drive member 202 extends axially between a spline 218 and an end of collar 216, and includes a first diaphragm element 226. First diaphragm element 226 is integrally connected to a seat 214 of first drive member 202 axially opposite spline 218, and extends circumferentially about collar 216. Second drive member 204 extends axially between a flange 222 and a second diaphragm element 228. Second diaphragm element 228 is integrally connected to second drive member 204 on an end thereof axially opposite flange 222. A single weld 243 couples first diaphragm member 226 with second diaphragm member 228, second drive member 204 being couple therethrough to first drive member 202.

It is contemplated that first drive member 202 and first diaphragm element 226 be integral with one another, integral as used herein meaning being jointless or weldless. Jointless and/or weldless arrangements can be formed by removing material from the interior and exterior of single piece of stock material using subtractive machining operations. Jointless and/or weldless arrangements can be formed using additive manufacturing techniques, such as power bed fusion techniques. Such integral construction has the advantage that the structure can be relatively light weight, there being no need to add material to compensate for reduced load carrying capability in the heat-affected zones generally formed in the vicinity of welds.

Diaphragm couplings, e.g., first diaphragm element 226 (shown in FIG. 2) and second diaphragm element 228 (shown in FIG. 2), can be used to reliably transmit torque, e.g., torque T (shown in FIG. 1) along a load path while accommodating axial and/or angular misalignment between driving and driven shafts, e.g., driving member 18 (shown in FIG. 1) and driven member 20 (shown in FIG. 1). The diaphragm coupling can be arranged to rotate through a bend angle defined between the driving member and the driven member, the diaphragm coupling having geometry arranged to distribute the stress associated with the transmitted torque according to predetermined amount of bending.

In some drive train systems, e.g., drive train system 16 (shown in FIG. 1), it can be necessary to limit the amount of angular misalignment accommodated by the diaphragm coupling. In embodiments of flexible couplings described herein, angular misalignment is limited by an angular stop fixed within the interior of one of the drive members and extending through the diaphragm coupling and into the other of the drive members. In certain embodiments, the angular stop is separated from an interior surface of the drive member within which it is seated by a radial gap such a seat of the drive member axially overlaps and is radially separated from the angular stop.

In the certain embodiments, the angular stop can have a first position wherein the angular stop is separated from the first member by an annular gap defined between the angular stop and the first member, the separation allowing the flexible coupling to accommodate angular misalignment while bending without mechanical contact (and associated wear) between the angular stop and the first member.

In accordance with certain embodiments, the angular stop can have first and second position within the interior of the second drive member. In the first position the angular stop can be separated from the second drive member, and the flexible coupling can be angularly unlimited. In the second position the angular stop can contact an interior surface of the second drive member, the flexible coupling being angularly limited by the contact between the angular stop and the interior of the second drive member. The contact limits the angular misalignment (and bending) of imposed on the diaphragm coupling, limiting stress while transmitting torque between the driving member and the second member. It is also contemplated that the contact prevent overstress of the flexible coupling during installation and removal, error-proofing the assembly process used to interconnect the flexible coupling between the driving and driven members of the drive train systems.

The methods and systems of the present disclosure, as described above and shown in the drawings, provide for flexible couplings with superior properties including structures for limiting coupling bending during coupling installation, coupling removal, and while transmitting torque between the coupling input and first members. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A flexible coupling, comprising:
a flexure;
a first drive member defining an axis and connected to the flexure;
a second drive member defining an axis and connected to the flexure on a side of the flexure opposite the first drive member; and
an angular stop fixed within the first drive member and extending through at least a portion of the second drive member,
wherein the angular stop is arranged to limit angular misalignment of the first drive member axis relative to the second drive member axis while transmitting torque between the first and second drive members,
wherein an open through-bore extends through the first drive member, the flexure, and the second drive member, wherein the through-bore tapers between a first width and a second width, the first width defined on a side of the angular stop opposite the flexure, the second width defined within the angular stop, the second width being smaller than the first width,
wherein the first drive member includes a seat, the seat axially overlapping the angular stop and being radially separated from the angular stop by an annular gap,
wherein the flexure comprises a first diaphragm element integrally connected to the first drive member and a second diaphragm element integrally connected to the second drive member, the first diaphragm element being coupled to the second diaphragm element by a weld, wherein an outer rim of the first diaphragm element is connected to an outer rim of the second diaphragm element, and wherein the first diaphragm element and the second diaphragm element each include a flexible diaphragm portion that tapers in axial thickness to a location of minimum thickness, and
wherein the first diaphragm element is connected to the first drive member at an inner hub of the first diaphragm element.

2. The flexible coupling as recited in claim 1, wherein the seat connects the annular stop to the flexure.

3. The flexible coupling as recited in claim 1, wherein the first drive member is coupled to the second drive member by a weld.

4. The flexible coupling as recited in claim 3, wherein the weld is disposed between the first drive member and the flexure.

5. The flexible coupling as recited in claim 3, wherein the weld is disposed between the second drive member and the flexure.

6. The flexible coupling as recited in claim 3, wherein the weld is disposed within the flexure.

7. The flexible coupling as recited in claim 3, wherein a single weld connects the first drive member to the second drive member.

8. The flexible coupling as recited in claim 1, wherein the second diaphragm element is connected to the second drive member at an inner hub of the second diaphragm element.

9. The flexible coupling as recited in claim 1, further comprising a spline disposed on one of the first and second drive members and a flange with a fastener pattern disposed on the other of the first and second drive members.

10. A drive train system, comprising:
a flexible coupling as recited in claim 1;
a drive member connected to the first drive member; and
a driven member connected to the second drive member,
wherein the angular stop has a first position and a second position, the angular stop being radially separated from the second drive member in the first position, the angular stop contacting the second drive member in the second position.

* * * * *